(12) United States Patent
Farre Guiu et al.

(10) Patent No.: US 11,741,129 B2
(45) Date of Patent: Aug. 29, 2023

(54) PERFORMANCE-BASED EVOLUTION OF CONTENT ANNOTATION TAXONOMIES

(71) Applicant: Disney Enterprises, Inc., Burbank, CA (US)

(72) Inventors: Miquel Angel Farre Guiu, Bern (CH); Monica Alfaro Vendrell, Barcelona (ES); Marcel Porta Valles, Balaguer (ES); Pablo Pernias, Sant Joan d'Alacant (ES); Marc Junyet Martin, Barcelona (ES); Melina Ovanessian, La Crescenta, CA (US); Anthony M. Accardo, Los Angeles, CA (US); Mara Idai Lucien, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 132 days.

(21) Appl. No.: 17/396,460

(22) Filed: Aug. 6, 2021

(65) Prior Publication Data
US 2023/0045354 A1 Feb. 9, 2023

(51) Int. Cl.
| | | |
|---|---|---|
| *A61N 1/00* | (2006.01) | |
| *G06F 16/28* | (2019.01) | |
| *G06N 20/00* | (2019.01) | |
| *G06F 16/2457* | (2019.01) | |

(52) U.S. Cl.
CPC ...... *G06F 16/285* (2019.01); *G06F 16/24573* (2019.01); *G06N 20/00* (2019.01)

(58) Field of Classification Search
CPC .. G06F 16/285; G06F 16/24573; G06N 20/00
USPC .................................................. 707/600–899
See application file for complete search history.

(56) References Cited

U.S. PATENT DOCUMENTS

| | | | |
|---|---|---|---|
| 10,146,751 B1 * | 12/2018 | Zhang ................... | G06F 16/313 |
| 2018/0061274 A1 * | 3/2018 | Frahling ............... | G06F 40/247 |

* cited by examiner

*Primary Examiner* — Isaac M Woo
(74) *Attorney, Agent, or Firm* — Farjami & Farjami LLP

(57) ABSTRACT

According to one implementation, a system includes a computing platform having processing hardware, a system memory storing a software code; and a machine learning model based classifier. The processing hardware is configured to execute the software code to receive tagging quality assurance (QA) data including multiple terms applied as tags and corrections to those tags, to identify, using the tagging QA data, a first problematic term, and to classify, using the machine learning model based classifier, the first problematic term as one of confusing or flawed. The processing hardware is further configured to execute the software code to obtain, when the first problematic term is classified as confusing, a comparative sample for clarifying use of the first problematic term, and to obtain, when the first problematic term is classified as flawed, modification data for editing a predetermined annotation taxonomy including the first problematic term.

17 Claims, 5 Drawing Sheets

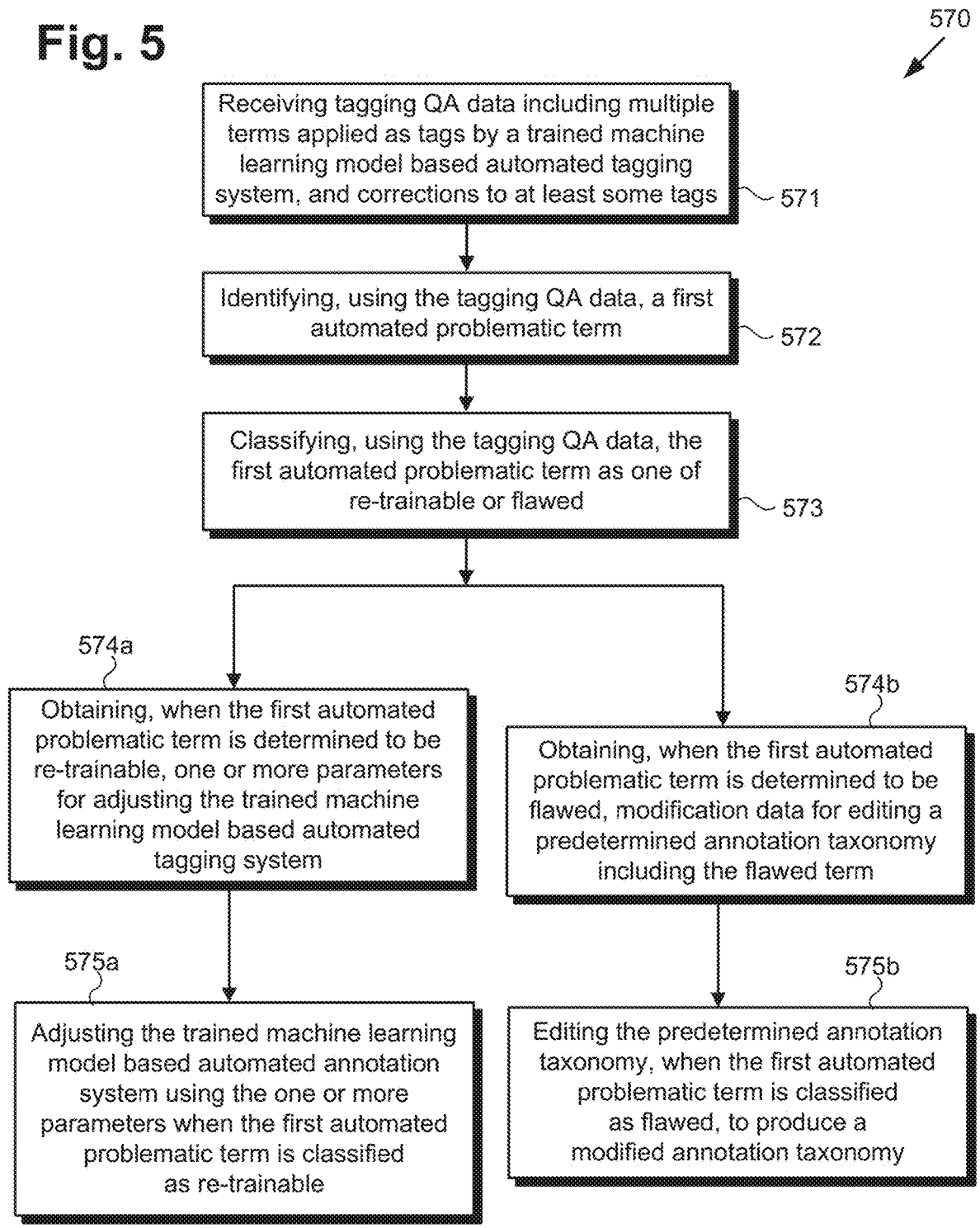

PERFORMANCE-BASED EVOLUTION OF CONTENT ANNOTATION TAXONOMIES

BACKGROUND

Due to its popularity as a content medium, ever more video is being produced and made available to users. As a result, the efficiency with which video content can be annotated. i.e., "tagged," and managed has become increasingly important to the producers, owners, and distributors of that video content. For example, annotation of video is an important part of the production process for television (TV) programming content and movies.

Tagging of video has traditionally been performed manually by human taggers, based on a predetermined set, or "taxonomy," of terms that may be applied as tags, while quality assurance (QA) for the tagging process is typically performed by human QA reviewers. However, in a typical video production environment, there may be such a large number of videos to be annotated that manual tagging and review become impracticable. In response, various automated systems for performing content tagging and QA review have been developed or are in development. While offering efficiency advantages over traditional manual techniques, the performance of automated systems, like the performance of human taggers, depends to a significant extent on the relevance and specificity of the typically closed set of terms included in the annotation taxonomy. Consequently, there is a need in the art for systems and methods for enhancing the performance of automated and human taggers alike through the performance-based evolution of content annotation taxonomies.

BRIEF DESCRIPTION OF THE DRAWINGS

FIG. 5 shows a flowchart outlining an exemplary method for executing performance-based evolution of content annotation taxonomies, according to another implementation.

DETAILED DESCRIPTION

Figure 1:
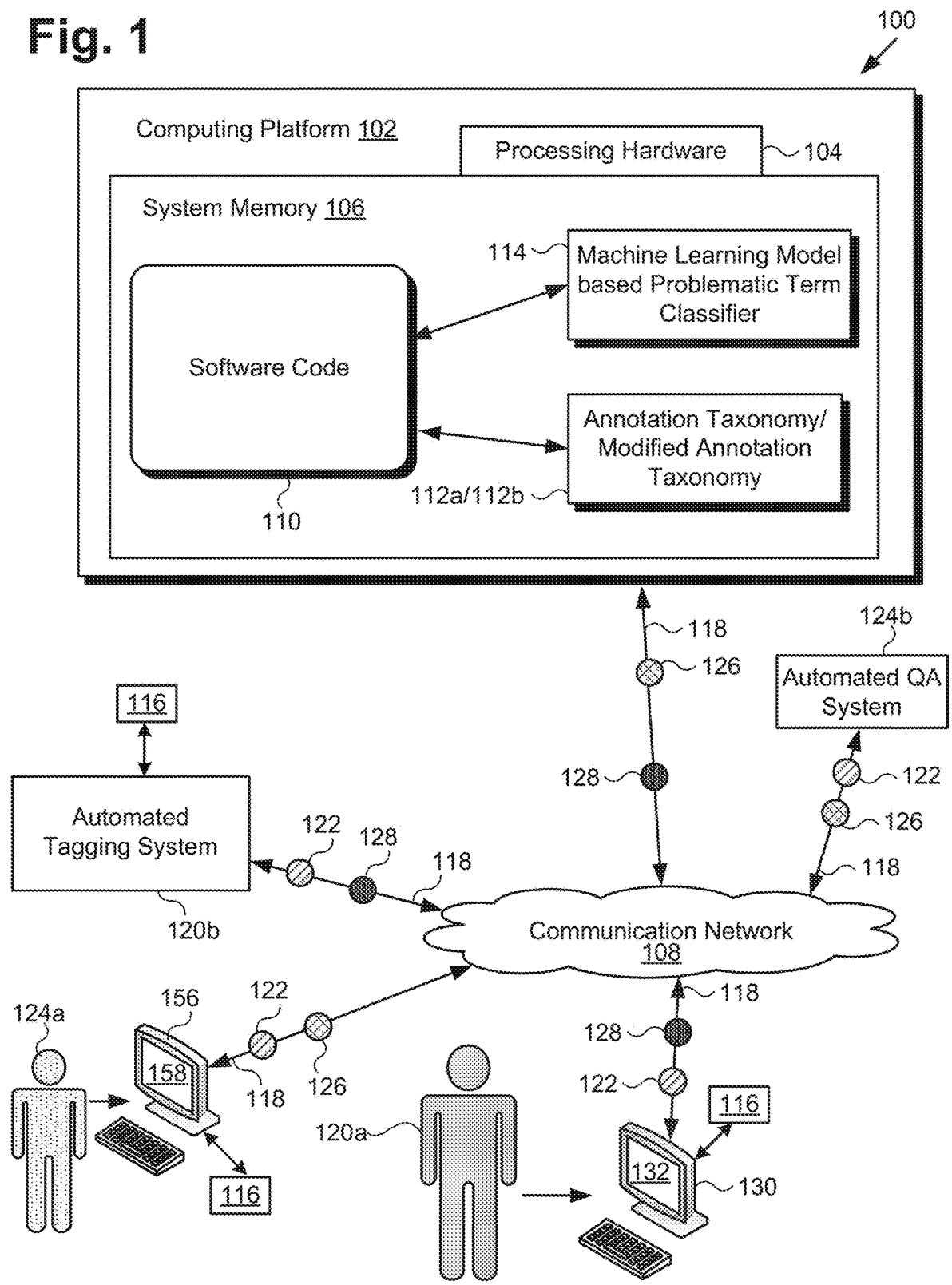
FIG. 1 shows a diagram of an exemplary system for executing performance-based evolution of content annotation taxonomies, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for executing performance-based evolution of content annotation taxonomies that overcome the drawbacks and deficiencies in the conventional art. It is noted that although the present solution is described below in detail by reference to the exemplary use case of content annotation, the present novel and inventive principles may more generally find other applications to increasing automation and efficiency for a variety of classification and quality assurance (QA) processes. For example, the present novel and inventive concepts may be applied to an image or groups of images, as well as other fields such as agricultural video annotation or music audio track annotation.

It is further noted that, as used in the present application, the terms "automation," "automated," and "automating" refer to systems and processes that do not require human intervention. Although, in some implementations, a human system administrator may review or even modify the performance of an automated system or process, that human involvement is optional. Thus, in some implementations, the systems and methods characterized as automated in the present application may be performed under the control of hardware processing components executing them.

Moreover, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs).

A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network. In various implementations, NNs may be trained as classifiers and may be utilized to perform image processing or natural-language processing.

FIG. 1 shows a diagram of exemplary system 100 for executing performance-based evolution of content annotation taxonomies, according to one implementation. System 100 includes computing platform 102 having processing hardware 104, and system memory 106 implemented as a non-transitory storage medium. As shown in FIG. 1, according to one implementation, system memory 106 stores software code 110, predetermined annotation taxonomy 112a, which after editing by software code 110 becomes modified annotation taxonomy 112b, and machine learning model based problematic term classifier 114. As further shown in FIG. 1, system 100 may be implemented in a use environment including one or both of human tagger 120a and automated tagging system 120b, one or both of human QA reviewer 124a and automated QA system 124b, manual tagging system 130 including display 132, and manual QA system 156 including display 158. According to the exemplary implementation shown in FIG. 1, manual tagging system 130 may be utilized by human tagger 120a to tag content 116, as well as to communicate with system 100 via communication network 108 and network communication links 118. In addition, manual QA system 156 may be utilized by human QA reviewer 124a to review and correct tags applied to content 116, as well as to communicate with system 100 via communication network 108 and network communication links 118. Also shown in FIG. 1 are annotation terms 122 applied as annotation tags (hereinafter "tags") to content 116, tagging QA data 126 including terms 122 applied as tags to content 116, as well as corrections to those tags made during QA review, and comparative sample 128 for clarifying use of a term identified by system 100 as problematic when used as a tag.

Although FIG. 1 depicts one human tagger 120a and one human QA reviewer 124a, that representation is merely in the interests of conceptual clarity. More generally, human tagger 120a may correspond to a single human tagger, or to multiple human taggers, such as tens or hundreds of human taggers, for example. Analogously, human QA reviewer 124a may correspond to one, or more than one, human QA reviewer.

With respect to the representation of system 100 shown in FIG. 1, it is noted that although software code 110, predetermined annotation taxonomy 112a, modified annotation taxonomy 112b, and machine learning model based problematic term classifier 114 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110, predetermined annotation taxonomy 112a, modified annotation taxonomy 112b, and machine learning model based problematic term classifier 114 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that software code 110, predetermined annotation taxonomy 112a, modified annotation taxonomy 112b, and machine learning model based problematic term classifier 114 may be stored remotely from one another within the distributed memory resources of system 100.

It is also noted that, in some implementations, machine learning model based problematic term classifier 114 may take the form of a software module included in software code 110. However, in other implementations, machine learning model based problematic term classifier 114 may be omitted from system 100 and the functionality attributed to that feature may be performed by software code 110.

Processing hardware 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although manual tagging system 130 and manual QA system 156 are shown as desktop computers in FIG. 1 that representation is provided merely as an example as well. More generally, manual tagging system 130 and manual QA system 156 may be any suitable mobile or stationary computing devices or systems that implement data processing capabilities sufficient to provide a user interface, support connections to communication network 108, and implement the functionality ascribed to manual tagging system 130 and manual QA system 156 herein. For example, in other implementations, either or both of manual tagging system 130 and manual QA system 156 may take the form of laptop computers, tablet computers, or smartphones, for example.

With respect to display 132 of manual tagging system 130, display 132 may be physically integrated with manual tagging system 130 or may be communicatively coupled to but physically separate from manual tagging system 130. For example, where manual tagging system 130 is implemented as a smartphone, laptop computer, or tablet computer, display 132 will typically be integrated with manual tagging system 130. By contrast, where manual tagging system 130 is implemented as a desktop computer, display 132 may take the form of a monitor separate from manual tagging system 130 in the form of a computer tower. Furthermore, display 132 of manual tagging system 130 may be implemented as a liquid crystal display (LCD), a light-emitting diode (LED) display, an organic light-emitting diode (OLED) display, a quantum dot (QD) display, or any other suitable display screen that performs a physical transformation of signals to light.

Analogously, display 158 may be physically integrated with manual QA system 156 or may be communicatively coupled to but physically separate from manual QA system 156, as described above by reference to display 132 of manual tagging system 130. Moreover, like display 132 of manual tagging system 130, display 158 of manual QA system 156 may be implemented as an LCD, LED display, OLED display, QD display, or any other suitable display screen that performs a physical transformation of signals to light.

By way of overview, one of the challenges in content tagging is achieving a high level of consistency across the tags that any tagger, human or automated, would apply to an item of content. This can be partially accomplished by controlling predetermined annotation taxonomy 112a to limit the terms, i.e., words or word strings, that may be used to tag content 116, and providing a scope that defines the proper use of each term as a tag. Nevertheless, term scopes can present some limitations in several different ways including: 1) the term is too general or too granular, 2) the term covers a narrow scope within a class (often due to developing a taxonomy against a homogenous sample of content), 3) a particular term is too abstract to be applied as a tag without context, and 4) for human taggers, a cultural barrier may exist based on translation or idiom. The performance-based solution for evolving a content annotation taxonomy disclosed in the present application advantageously addresses and overcomes these problems for both human taggers and machine learning model based automated tagging systems.

Figure 2:
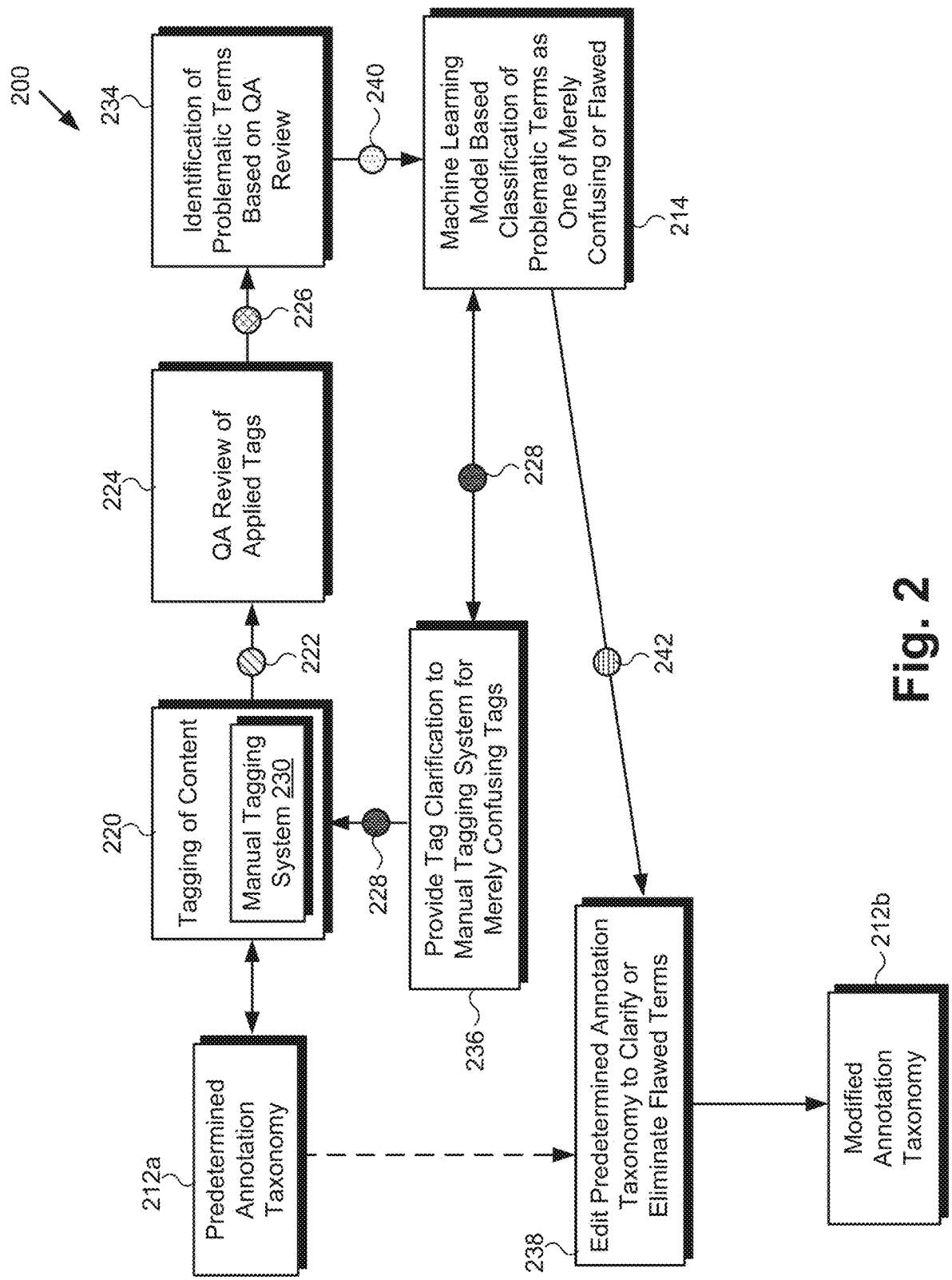
FIG. 2 shows an exemplary pipeline for the execution of performance-based evolution of content annotation taxonomies, according to one implementation.

FIG. 2 shows exemplary pipeline 200 for the execution of performance-based evolution of content annotation taxonomies, according to one implementation. As shown in FIG. 2, pipeline 200 includes predetermined annotation taxonomy 212a, tagging block 220 including manual tagging system 230, QA review block 224, problematic term identification block 234, machine learning model based classification block 214, confusing term clarification block 236, annotation taxonomy editing block 238, and modified annotation taxonomy 212b. Also shown in FIG. 2 are terms 222 applied as tags to content 116 in FIG. 1, tagging QA data 226, problematic term data 240, comparative sample 228 for clarifying use of a term identified as merely confusing, as a tag, and modification data 242 for editing predetermined annotation taxonomy 212a.

Predetermined annotation taxonomy 212a, modified annotation taxonomy 212b, manual tagging system 230, terms 222, tagging QA data 226, and comparative sample 228, in FIG. 2, correspond respectively in general to predetermined annotation taxonomy 112a, modified annotation taxonomy 112b, manual tagging system 130, terms 122, tagging QA data 126, and comparative sample 128, in FIG. 1. Consequently, predetermined annotation taxonomy 212a, modified annotation taxonomy 212b, manual tagging system 230, terms 222, tagging QA data 226, and comparative sample 228 may share any of the characteristics attributed to respective predetermined annotation taxonomy 112a, modified annotation taxonomy 112b, manual tagging system 130, terms 122, tagging QA data 126, and comparative sample 128 by the present disclosure, and vice versa.

Referring to FIGS. 1 and 2 in combination, pipeline 200 begins with tagging block 220 in which content 116 is tagged in a manual tagging process performed by human tagger 120a utilizing manual tagging system 130/230, or in an automated process performed by automated tagging system 120b, using terms included in predetermined annotation taxonomy 112a/212a. Pipeline 200 continues at QA review block 224 where a QA review of terms 122/222 applied as tags to content 116 by human tagger 120a or automated tagging system 120b is performed by human QA reviewer 124a or automated QA system 124b. Tagging QA data 126/226 produced by QA review block 224 is used for identification of problematic terms among terms 122/222 at problematic term identification block 234. Machine learning model based classification block 214 receives the problematic terms and distinguishes merely confusing terms from flawed terms. By way of definition, it is noted that a confusing term is one that is problematic because human tagger 120a or automated tagging system 120b does not understand or has not adequately learned its correct usage as a tag. By contrast, a flawed term is one which is intrinsically ill defined, leading to contradictions when the flawed term is applied as a tag. That is to say tagging and QA review entities may disagree, but the cause of that disagreement is the ambiguity of the term itself.

Confusing tag clarification block 236 may be used to receive or obtain comparative sample 128/228 for clarifying use of a problematic term classified as merely confusing, and to output comparative sample 128/228 to manual tagging system 130/230, as shown in FIG. 2, or to automated tagging system 120b. For those problematic terms classified as flawed, taxonomy editing block 238 may use modification data 242 received from machine learning model based classification block 214 to edit predetermined annotation taxonomy 112a/212a so as to produce modified annotation taxonomy 112b/212b.

Figure 3:
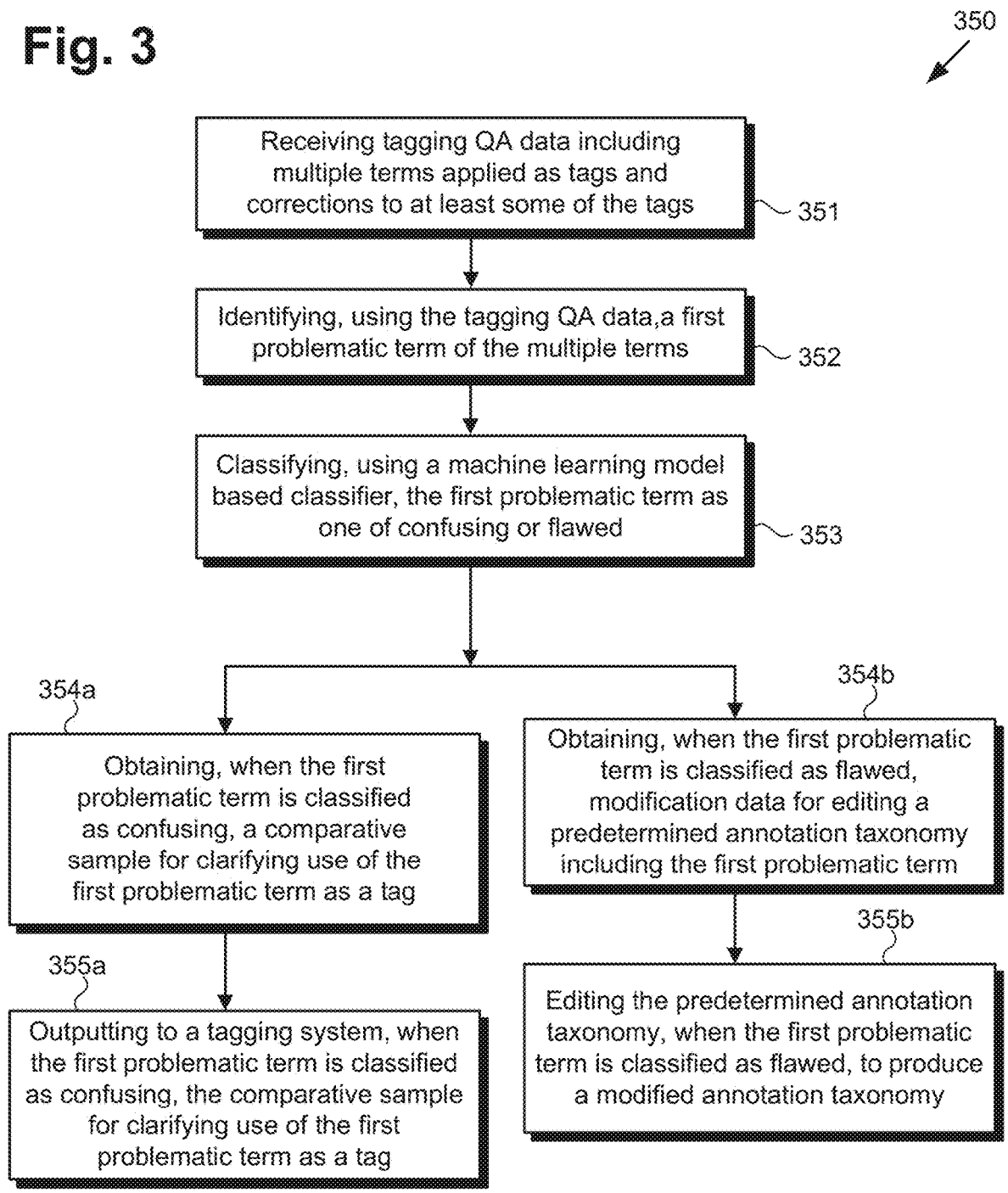
FIG. 3 shows a flowchart outlining an exemplary method for executing performance-based evolution of content annotation taxonomies, according to one implementation.

The functionality of system 100 and pipeline 200 will be further described by reference to FIG. 3. FIG. 3 shows flowchart 350 presenting an exemplary method for use by system 100 to execute performance-based evolution of predetermined content annotation taxonomies based on pipeline 200, according to one implementation. With respect to the method outlined in FIG. 3, it is noted that certain details and features have been left out of flowchart 350 in order not to obscure the discussion of the inventive features in the present application. It is further noted that although the method outlined by flowchart 350 refers specifically to a "first problematic term," the method can be repeated for additional problematic terms, and the classification of such terms may be performed independently of the classification of the first problematic term. That is to say, additional terms classified as problematic may be classified differently from the first problematic term and may thus result in classification of one or more problematic terms as merely confusing and one or more other problematic terms as flawed.

Referring now to FIG. 3 in combination with FIGS. 1 and 2, flowchart 350 begins with receiving tagging QA data 126/226 including multiple terms 122/222 applied as tags to content 116, and corrections to at least some of terms 122/222 (action 351). As described above by reference to FIG. 1, terms 122/222 are applied to content 116 as tags as part of a content annotation process. Content 116 may include images, audio, video, or broadcast or streamed audio-video (AV) content in the form of one or more television (TV) episodes, movies, animations, video games, audio tracks, music videos, or content artwork for example. Moreover, in some use cases, content 116 may include a description or interpretation of the narrative arc of a story, or characteristics of objects, such as their color or shape, for instance. Terms 122/222 may be applied to content 116 as tags in an annotation process performed by one or more tagging entities in the form of human tagger 120a or automated tagging system 120b, which may be a trained machine learning model based automated tagging system. For example, automated tagging system 120b, when utilized, may implement a machine learning model, such as a neural network (NN) trained to apply annotations to content corresponding to content 116. Exemplary implementations of automated tagging system 120b and its operation are disclosed by U.S. Pat. No. 10,057,644, titled "Video Asset Classification," and issued on Aug. 21, 2018, which is hereby incorporated fully by reference into the present application.

The corrections to terms 122/222 identified by tagging QA data 126/226 may be made by one or more QA entities in the form of human QA reviewer 124a or automated QA system 124b. Automated QA system 124b, when utilized, may implement a machine learning model, such as an NN trained to review and correct tags applied to content corresponding to content 116. As shown in FIG. 1, tagging QA data 126/226 may be received by system 100 via communication network 108 and network communication links 118. Tagging QA data 126/226 may be received by software code 110, executed by processing hardware 104 of computing platform 102.

Flowchart 350 further includes identifying, using tagging QA data 126/226, a first problematic term among terms 122/222 applied as tags to content 116 (action 352). Identification of the first problematic term among terms 122/222 applied as tags to content 116 may include a comparison of terms 122/222 with the corrections to tags identified by tagging QA data 126/226, for example. For instance, once tagging of content 116 has been completed by human tagger 120a or automated tagging system 120b, and has undergone QA review by human QA reviewer 124a or automated QA system 124b, the number of instances in which an applied tag has been accepted or rejected during QA can be determined. Aggregating those QA results across multiple "tasks of the same type" and calculating ratios of the number of rejections to the number of times a particular term was applied as a tag, for example, the terms that are the most challenging for a tagging entity to apply correctly may be identified as problematic terms. It is noted that, as defined in the present application, the expression "tasks of the same type" refers to the tagging of content in which the same annotation taxonomy is drawn upon to answer the same question, e.g., specifically, actions included in video, as opposed to objects, persons, or locations in the video, are tagged using the same annotation taxonomy.

By way of example, a threshold ratio of the number of times a particular term applied as a tag was rejected to the total number of times it was applied during tagging, such as 0.3 or greater, or any other preferred threshold ratio, may be used to automatically flag terms among terms 122/222 as problematic terms. Identification of at least some of terms 122/222 as problematic terms in action 352 may be performed by software code 110, executed by processing hardware 104 of computing platform 102.

Flowchart 350 further includes classifying, using machine learning model based classification block 214 of pipeline 200, the first problematic term identified in action 352 as one of a confusing term or a flawed term (action 353). As shown in FIG. 2, machine learning model based classification block 214 receives problematic term data 240 as input. Problematic term data 240 may include a list of terms identified as problematic based on tagging QA data 126/226, as well as the timestamps where the correct and incorrect uses of the problematic term as a tag can be found in content 116. As noted above, content 116 may include images, audio, video, or AV content in the form of one or more TV episodes, movies, animations, video games, audio tracks, music videos, or content artwork.

As part of action 353, processing hardware 104 of computing platform 102 may execute software code 110 to download or otherwise obtain either content 116, or segments of content 116 where the first problematic term has been used correctly and incorrectly as tags, to train machine learning model based problematic term classifier 114 to distinguish between correct and incorrect uses of the first problematic term as a tag using the content or content segments as input, and to assess the performance of trained machine learning model based problematic term classifier 114. Action 353 may be performed by software code 110, executed by processing hardware 104 of computing platform 102, and using machine learning model based problematic term classifier 114.

When the above described training is successful, i.e., machine learning model based problematic term classifier 114 can be trained to correctly apply the first problematic term as a tag, the first problematic term may be classified as merely confusing in action 353, i.e., a term that can be used correctly as a tag by reference to comparative sample 128/228. In use cases in which machine learning model based problematic term classifier 114 can be successfully trained to distinguish between correct and incorrect applications of the confusing problematic term as a tag, flowchart 350 may continue with obtaining comparative sample 128/228 for clarifying use of that first problematic term as a tag (action 354a). For example, a positive and a negative example of application of the confusing problematic term may be obtained from the centroids of clusters identified by trained machine learning model based problematic term classifier 114. Action 354a may be performed by software code 110, executed by processing hardware 104 of computing platform 102.

When the above described training of machine learning model based problematic term classifier 114 is unsuccessful, based for example on its F-score (precision recall) compared to a predetermined threshold score, the first problematic term may be classified as flawed in action 353, i.e., is unusable in its present state or based on its present scope. In use cases in which machine learning model based problematic term classifier 114 cannot be successfully trained to distinguish between correct and incorrect applications of the flawed problematic term as a tag, flowchart 350 may continue with obtaining modification data 242 for editing predetermined annotation taxonomy 112a/212a including that flawed problematic term (action 354b).

For example, in response to classifying the first problematic term as flawed in action 353, modification data 242 obtained in action 354b may instruct modification of predetermined annotation taxonomy 112a/212a through modification of the flawed term or its scope, substitution of another term for the flawed term, deletion of the flawed term from predetermined annotation taxonomy 112a/212a, or by providing an alternative to the flawed term that makes proper application of the flawed term and its alternative as tags more intuitive. Action 354b may be performed by software code 110, executed by processing hardware 104 of computing platform 102.

It is noted that modification data 242 may be provided by human annotation taxonomy librarians or a human system administrator based on the results of action 353. It is further noted that, as used in the present application, "modification" of a flawed term or its scope refers to any alteration of an existing term or the scope describing its proper application. For example, a "modification" to a term may add a prefix or a suffix to the term or may remove an existing prefix or suffix. Alternatively, a modification may leave a term unchanged, but may alter the scope describing the term and its use as a tag. In addition, as used herein, "substitution" of a term refers to removal and replacement of a flawed term by another term. "Deletion" of a term from an annotation taxonomy refers to removal without replacement of a flawed term, resulting in reduction of the number of terms included in the annotation taxonomy. Providing an "alternative" to a flawed term refers to introducing a related term having a similar scope to the annotation taxonomy without removing the flawed term from the annotation taxonomy, and linking the alternative and flawed terms so that both are presented to tagging entity concurrently as alternative options for use in tagging.

In some implementations, flowchart 350 may further include outputting to one or more of manual tagging system 130/230 and automated tagging system 120b, when the first problematic term is classified as confusing, comparative sample 128/228 for clarifying use of the confusing problematic term as a tag (action 355a). As shown in FIG. 1, comparative sample 128/228 may be output to one or more of manual tagging system 130/230 and automated tagging system 120b via communication network 108 and network communication links 118. Action 355a may be performed by software code 110, executed by processing hardware 104 of computing platform 102.

In some implementations, flowchart 350 may further include editing predetermined annotation taxonomy 112a/212a using modification data 242 when the first problematic term is classified as a flawed term, to produce modified annotation taxonomy 112b/212b (action 355b). As noted above, modification of predetermined annotation taxonomy 112a/212a may include modification of the flawed term or its scope, substitution of another term for the flawed term, deletion of the flawed term from predetermined annotation taxonomy 112a/212a, or by providing an alternative to the flawed term that makes proper application of the flawed term and its alternative as tags more intuitive. Action 355b may be performed by software code 110, executed by processing hardware 104 of computing platform 102. Alternatively, or in addition, action 355b may be performed manually by one or more human annotation taxonomy librarians based on instructions provided by system 100. It is noted that once action 355b has been completed, modified annotation taxonomy 112b/212b supplants, i.e., supersedes and replaces, predetermined annotation taxonomy 112a/212a as the closed set of terms eligible for use in tagging content 116.

In some use cases, action 355b may include adjusting the scope of the flawed term based on the correct and incorrect applications of the flawed term as a tag to content 116. Once the scope is adjusted to render interpretation of correct uses of the term more readily apparent, the scope adjustment may be communicated to one or more of human tagger 120a and automated tagging system 120b. Alternatively, or in addition predetermined annotation taxonomy 112a/212a may be modified to include alternate specific terms that are easy to understand. For example, where the term "demolition" is frequently misapplied as a tag to situations in which a construction repair process includes removal of a physical feature, specific examples distinguishing "demolition" from "repairing" may be added to predetermined annotation taxonomy 112a/212a to produce modified annotation taxonomy 112b/212b.

As a specific example, where predetermined annotation taxonomy 112a/212a may have included the alternative terms "demolition" and "repair," modified annotation taxonomy 112b/212b may include the following expanded options as subclasses of demolition and repair:

Demolition
   Demolition of a building
   Demolition of a bridge
Repairing
   Repair of a window
   Repair of a wall It is noted that in some implementations, the subclasses may make it easier to distinguish between the proper application of the terms demolition and repair as tags without altering the number of tags applicable based on annotation taxonomy. That is to say, for example, although manual tagging system 130/230 may display the above subclasses to human tagger 120a, selection of either "demolition of a building" or "demolition of a bridge" will result in application of the term "demolition" alone as a tag for the relevant segment of content 116. Similarly, selection of either "repair of a window" or "repair of a wall" will result in application of the term "repair" alone as a tag for the relevant segment of content 116.

In some use cases, predetermined annotation taxonomy 112a/212a may be overly detailed. By way of example, an annotation taxonomy that includes the term "stairs" as well as the term "staircase," or the terms "walkway," "sidewalk," and "path" may generate unnecessary confusion during tagging. For manual tagging by human tagger 120a, one solution to overly detailed annotation taxonomies may be to selectively prune similar or overlapping terms from such a taxonomy to provide clearer distinctions between terms.

For automated tagging system 120b, by contrast, instead of looking at the classes of terms used as tags having high variance and poor classification metrics, classes that are close in the taxonomy and show high correlation values in the confusion matrix for automated tagging system 120b can be identified. As known in the art, the confusion matrix for a trained machine learning model compares the predicted values of the model with the actual ground truth values. If the model were perfect, its confusion matrix would be a diagonal matrix.

Otherwise, high off-diagonal values in rows reveal which classes of terms the model confuses more than others. Some of those terms having a high conceptual overlap may be pruned, or additional representative subclasses may be added to help reduce confusion, as described above, without increasing the number of terms applicable as tags based on the annotation taxonomy.

It is noted that, in some use cases, terms 122/222 may be determined to include one or more confusing problematic terms but no flawed problematic terms. In those use cases, action 354a may be followed by action 355a, while actions 354b and 355b may be omitted. Alternatively, in some use cases, terms 122/222 may be determined to include one or more flawed problematic terms but no problematic terms that are merely confusing. In those use cases, action 354b may follow action 353 and may in turn be followed by action 355b, while actions 354a and 355a may be omitted.

Moreover, in use cases in which problematic terms include both merely confusing terms and flawed terms, actions 354a and 354b may be performed in parallel, i.e., substantially concurrently. In addition, in those use cases actions 355a and 355b may also be performed in parallel. i.e., substantially concurrently.

Figure 4:
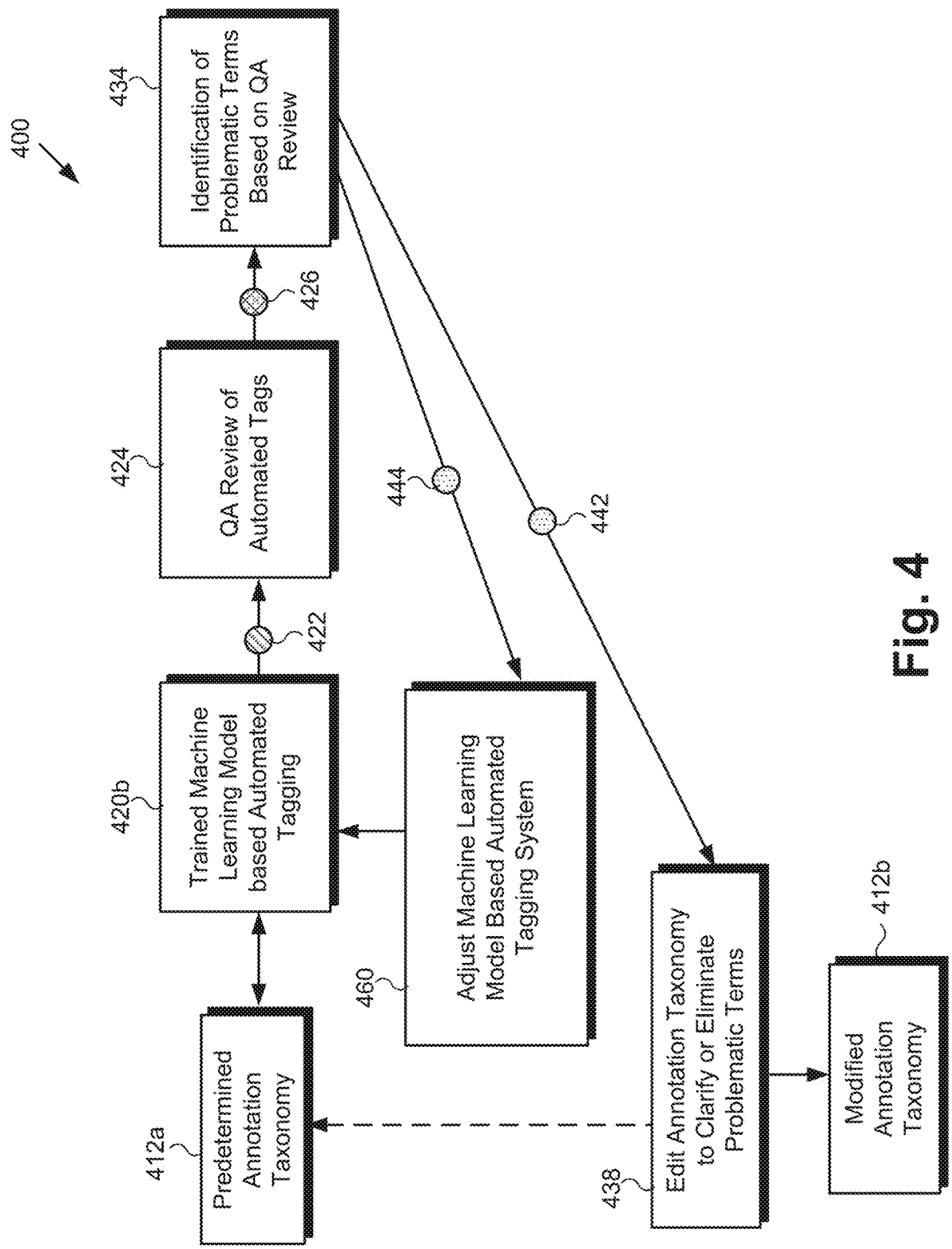
FIG. 4 shows another exemplary pipeline for the execution of performance-based evolution of content annotation taxonomies.

FIG. 4 shows exemplary pipeline 400 for the execution of performance-based evolution of content annotation taxonomies, according to another implementation. As shown in FIG. 4, pipeline 400 includes predetermined annotation taxonomy 412a, trained machine learning model based automated tagging system 420b, QA review block 424, problematic term identification block 434, automated tagging system adjustment block 460, taxonomy editing block 438, and modified annotation taxonomy 412b. Also shown in FIG. 4 are terms 422, tagging QA data 426, re-training data 444, and modification data 442 for editing predetermined annotation taxonomy 412a.

Predetermined annotation taxonomy 412a, modified annotation taxonomy 412b, terms 422, and tagging QA data 426, in FIG. 4, correspond respectively in general to predetermined annotation taxonomy 112a/212a, modified annotation taxonomy 112b/212b, terms 122/222, and tagging QA data 126/226, in FIGS. 1 and 2. Consequently, predetermined annotation taxonomy 412a, modified annotation taxonomy 412b, terms 422, and tagging QA data 426 may share any of the characteristics attributed to respective predetermined annotation taxonomy 112a/212a, modified annotation taxonomy 112b/212b, terms 122/222, and tagging QA data 126/226 by the present disclosure, and vice versa. In addition, trained machine learning model based automated tagging system 420b, in FIG. 4, corresponds in general to automated tagging system 120b, in FIG. 1, while modification data 442 corresponds in general to modification data 242, in FIG. 2. Thus, trained machine learning model based automated tagging system 420b and modification data 442 may share any of the characteristics attributed to respective automated tagging system 120b and modification data 242 by the present disclosure, and vice versa.

Referring to FIGS. 1 and 4 in combination, pipeline 400 begins with trained machine learning model based automated tagging system 420b in which content 116 is tagged in an automated tagging process performed by automated tagging system 120b, using predetermined annotation taxonomy 112a/412a. Pipeline 400 continues at QA review block 424 where a QA review of terms 122/422 applied as tags to content 116 by automated tagging system 120b is performed by human QA reviewer 124a or by automated QA system 124b. Tagging QA data 126/426 produced by QA review block 424 is used for identification of automated problematic terms 122/422 among the tags applied to content 116 at problematic term identification block 434. Problematic term identification block 434 also classifies, using tagging QA data 126/426, the automated problematic term as one of re-trainable or flawed. It is noted that the expression "re-trainable term" refers to a term that automated tagging system 120b has not learned to apply correctly as a tag, but for which correct application as a tag can be learned with more training. It is further noted that the expression "flawed term" has the same meaning attributed to it above.

Machine learning model based automated tagging system adjustment block 460 is configured to obtain, when an automated problematic term is determined to be re-trainable, one or more parameters for adjusting automated tagging system 120b. Examples of such parameters include learning rate, thresholds or splits for training, testing and validation datasets, and penalties applied during training, to name a few. For those automated problematic terms determined to be flawed, taxonomy editing block 438 may be used to modify predetermined annotation taxonomy 112a/412a to produce modified annotation taxonomy 112b/412b.

The functionality of system 100 and pipeline 400 will be still further described by reference to FIG. 5. FIG. 5 shows flowchart 570 presenting an exemplary method for use by system 100 to execute performance-based evolution of predetermined content annotation taxonomies based on pipeline 400, according to another implementation. With respect to the method outlined in FIG. 5, it is noted that certain details and features have been left out of flowchart 570 in order not to obscure the discussion of the inventive features in the present application. It is further noted that although the method outlined by flowchart 570 refers specifically to a "first automated problematic term," the method can be repeated for additional automated problematic terms, and the classification of such terms may be performed independently of the classification of the first automated problematic term. That is to say, additional terms classified as automated problematic terms may be classified differently from the first automated problematic term and may thus result in classification of one or more automated problematic terms as re-trainable and one or more other automated problematic terms as flawed.

Referring to FIGS. 3 and 5 in combination, it is also noted that, although in some implementations the methods outlined by flowcharts 350 and 570 may be performed independently of one another, in other implementations, the actions listed in flowchart 570 may be used to extend the method outlined by flowchart 350, or vice versa. That is to say, in some implementations, the actions described by flowcharts 350 and 570 may be executed together as part of a consolidated method to execute performance-based evolution of predetermined content annotation taxonomies.

Referring now to FIG. 5 in combination with FIGS. 1 and 4, flowchart 570 begins with receiving tagging QA data 126/426 including terms 122/422 applied as tags to content 116 by trained machine learning model based automated tagging system 120b/420b, and corrections to at least some of those tags (action 571). As described above by reference to FIG. 1, terms 122/422 may be applied at tags to content 116 as part of a content annotation process performed by trained machine learning model based automated tagging system 120b/420b. As further noted above, exemplary implementations of trained machine learning model based automated tagging system 120b/420b and its operation are disclosed by U.S. Pat. No. 10,057,644, titled "Video Asset Classification," and issued on Aug. 21, 2018, which is incorporated fully by reference into the present application.

The corrections to terms 122/422 applied as tags to content 116 that are identified by tagging QA data 126/426 may be made by one or more QA entities in the form of human QA reviewer 124a or automated QA system 124b. As noted above, automated QA system 124b, when utilized, may implement a machine learning model, such as an NN trained to review and correct annotations applied to content corresponding to content 116. As shown in FIG. 1, tagging QA data 126/426 may be received by system 100 via communication network 108 and network communication links 118. Tagging QA data 126/426 may be received by software code 110, executed by processing hardware 104 of computing platform 102.

Flowchart 570 further includes identifying, using tagging QA data 126/226, a first automated problematic term of terms 122/422 (action 572). The identification of the first automated problematic term among terms 122/422 may include a comparison of terms 122/422 applied as tags with the corrections to those tags identified by tagging QA data 126/426, for example. For instance, once tagging of content 116 has been completed by machine learning model based automated tagging system 120b/420b, and has undergone QA review by human QA reviewer 124a or automated QA system 124b, the number of instances in which an applied tag has been accepted or rejected during QA can be determined. Aggregating those QA results across multiple tasks of the same type and calculating ratios of the number of rejections of a term to the number of times that particular term was applied as a tag, for example, the terms that are the most challenging for machine learning model based automated tagging system 120b/420b to apply correctly as tags may be identified as automated problematic terms. By way of example, a threshold ratio of the number of times a particular term was rejected to the number of times it was applied as a tag during tagging, such as 0.3 or greater, or any other preferred threshold ratio, may be used to automatically flag terms among terms 122/422 as automated problematic terms. Identification of at least some of terms 122/422 as automated problematic terms in action 572 may be performed by software code 110, executed by processing hardware 104 of computing platform 102.

Flowchart 570 further includes classifying, using tagging QA data 126/426, the first automated problematic term as one of re-trainable or flawed (action 573). Automated problematic terms resulting in confusion between different subclasses of the same class may be classified as re-trainable terms. For instance, confusion between the application of the terms "dining table" and "picnic table" (e.g., subclasses of "table") may be corrected through re-training of trained machine learning model based automated tagging system 120b/420b after adjustment of its penalties or other parameters.

However, some terms included in predetermined annotation taxonomy 112a/412a and identified as automated problematic terms in action 572 may be too abstract for trained machine learning model based automated tagging system 120b/420b to learn and apply correctly as tags, and thus may be classified as flawed in action 573. Those cases can be identified by looking for classes of automated problematic terms with high variance and poor classification metrics. With respect to the expression "high variance," it is noted that automated tagging system 120b/420b is executed using techniques such as dropout that give low randomness in the results. "High variance" means high statistical variance (relative to some selected threshold) on the output values of the automated tagging system 120b/420b when predicting a particular tag. "Classification metrics" describe how well the automated tagging system 120b/420b performs for a particular class (e.g., the number of times a tag was accepted during QA divided by the number of times that tag was applied by automated tagging system 120b/420b).

Both variance and classification metrics should be considered because in some cases trained machine learning model based automated tagging system 120b/420b might work properly with a class of terms having high variance if that variance does not affect the relevant features of the object being tagged (e.g., the class "chair" can have a wide variety of designs, but most of them share the same common elements), while a class with low variance can have poor classification metrics. Automated problematic term variance can be measured using the learned embeddings from trained machine learning model based automated tagging system 120b/420b. Action 573 may be performed by software code 110, executed by processing hardware 104 of computing platform 102.

In use cases in which the first automated problematic term is determined to be a re-trainable term in action 573, flowchart 570 may continue with obtaining one or more parameters for adjusting trained machine learning model based automated tagging system 120b/420b (action 574a). For example, as noted above, one or more parameters of trained machine learning model based automated tagging system 120b/420b, such as penalties applied during re-training of trained machine learning model based automated tagging system 120b/420b, for example, may be obtained for adjusting or tuning the performance of machine learning model based automated tagging system 120b/420b. Action 574a may be performed by software code 110, executed by processing hardware 104 of computing platform 102.

In use cases in which the first automated problematic term is determined to be flawed in action 573, flowchart 570 may continue with obtaining modification data 442 for editing predetermined annotation taxonomy 112a/412a including that flawed term (action 574b). For example, in response to determining that an automated problematic term is flawed in action 573, modification data 442 obtained in action 574b may instruct modification of predetermined annotation taxonomy 112a/412a through modification of the flawed term or its scope, substitution of another term for the flawed term, deletion of the flawed term from predetermined annotation taxonomy 112a/412a, or by providing an alternative to the flawed term that makes proper application of the flawed term and its alternative as tags more intuitive. Action 574b may be performed by software code 110, executed by processing hardware 104 of computing platform 102.

In some implementations, flowchart 570 may further include adjusting trained machine learning model based automated tagging system 120b/420b using the one or more parameters obtained in action 574a, when the first automated problematic term is determined to be a re-trainable term (action 575a). As shown in FIG. 4, re-training data 444 for adjusting trained machine learning model based automated tagging system 120b/420b using the one or more parameters obtained in action 574a may be output to automated tagging system adjustment block 460. Action 575a may be performed by software code 110, executed by processing hardware 104 of computing platform 102.

In some implementations, the one or more parameters obtained in action 574a may be used to modify, discard, or substitute trained machine learning model based automated tagging system 120b/420b. For example, the one or more parameters obtained in action 574a may be used to modify a machine learning model implemented by automated content annotation system 120b/420b so as to improve the accuracy of the terms applied as tags to content in the future. It is noted that exemplary implementations of such machine learning model improvement solutions are provided in U.S. Pat. No. 10,489,722 titled "Semiautomatic Machine Learning Model Improvement and Benchmarking," and issued on Nov. 26, 2019, and which is also hereby incorporated fully by reference into the present application.

In some implementations, flowchart 570 may further include editing predetermined annotation taxonomy 112a/412a using modification data 442 when the first automated problematic term is classified as a flawed term, to produce modified annotation taxonomy 112b/412b (action 575b). As noted above, modification of predetermined annotation taxonomy 112a/412a may include modification of the flawed term or its scope, substitution of another term for the flawed term, deletion of the flawed term from predetermined annotation taxonomy 112a/412a, or by providing an alternative to the flawed term that makes proper application of the flawed term and its alternative as tags more intuitive. Action 575b may be performed by software code 110, executed by processing hardware 104 of computing platform 102.

In some use cases, action 575b may include editing predetermined annotation taxonomy 112a/412a to include alternate specific terms that are easier to apply as a tag than a higher level abstract term. For example, the term "fruit" may be determined to be flawed due to its being too abstract to be easily learned and applied as a tag by machine learning model based automated tagging system 120b/420b. That is to say, the term may be determined to be "too abstract" when machine learning model based automated tagging system 120b/420b cannot learn its correct application and displays high variance and poor classification metrics when applying the term as a tag. The difficulty introduced by an abstract term such as "fruit" is that it requires machine learning model based automated tagging system 120b/420b to search for common patterns across all fruits, which can differ considerably in color, shape, and size. In such a use case, predetermined annotation taxonomy 112a/412a may be edited such that modified annotation taxonomy 112*b*/412*b* includes the following subclasses of the term "fruit:"

Fruit
  Pineapple
  Banana
  Watermelon
  Mango

It is noted that in some implementations, the subclasses may make it easier to learn the proper application of the term fruit as a tag without increasing the number and variety of annotation tags output by machine learning model based automated tagging system 120*b*/420*b*. That is to say, for example, although machine learning model based automated tagging system 120*b*/420*b* may use the above subclasses, selection of any one of the terms "Pineapple," "Banana," "Watermelon," or "Mango" will result in the automated application of the tag "fruit" alone to the relevant segment of content 116.

It is noted that, in some use cases, terms 122/422 may be determined to include one or more re-trainable automated problematic terms but no flawed automated problematic terms. In those use cases, action 574*a* may be followed by action 575*a*, while actions 574*b* and 575*b* may be omitted. Alternatively, in some use cases, terms 122/422 may be determined to include one or more flawed automated problematic terms but no re-trainable automated problematic terms. In those use cases, action 574*b* may follow action 573 and may in turn be followed by action 575*b*, while actions 574*a* and 575*a* may be omitted.

Moreover, in use cases in which automated problematic terms include both re-trainable terms and flawed terms, actions 574*a* and 574*b* may be performed in parallel, i.e., substantially concurrently. In addition, in those use cases action 575*b* may be performed in parallel. i.e., substantially concurrently with action 575*a*.

Referring to FIG. 1. FIG. 3, and FIG. 5 in combination, it is reiterated that in some implementations, the actions outlined by either or both of flowcharts 350 and 570 may be performed by system 100 in one or more substantially automated processes from which human intervention may be omitted.

Thus, the present application discloses systems and methods for executing performance-based evolution of content annotation taxonomies that overcome the drawbacks and deficiencies in the conventional art. According to some implementations, the solution disclosed in the present application advances the state-of-the-art by using performance-based cues to identify problematic terms included in a predetermined annotation taxonomy for tagging content, and further utilizes a machine learning model based classifier to distinguish between problematic terms that are merely confusing and those that are more fundamentally flawed. In response to the presence of confusing terms, the present solution provides comparative examples to clarify proper use of the confusing terms as tags. According to some implementations, the solution disclosed in the present application further advances the state-of-the-art by using performance-based cues to identify terms included in a predetermined annotation taxonomy that are problematic for use by automated tagging systems, and also distinguishes automated problematic terms for which the automated systems can be re-trained from those that are more fundamentally flawed. In response to the presence of flawed terms within the predetermined annotation taxonomy, the present solution may modify the annotation taxonomy through modification of the flawed terms or their scope, substitution of another term for a flawed term, deletion of the flawed terms from the taxonomy, or by providing an alternative to a flawed term that makes proper application of the flawed term and its alternative as tags more intuitive.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A computing platform comprising:
a processing hardware;
a system memory storing a software code; and
a machine learning model based classifier;
the processing hardware configured to execute the software code to:
  receive tagging quality assurance (QA) data including a plurality of terms applied as tags by a trained machine learning model based automated tagging system;
  identify, using the tagging QA data, a problematic term of the plurality of terms;
  classify, using the machine learning model based classifier, the problematic term as one of a re-trainable term or a flawed term;
  when the problematic term is classified as the re-trainable term, adjust, using one or more parameters, the trained machine learning model based automated tagging system; and
  when the problematic term is classified as the flawed term, edit, using modification data, an annotation taxonomy.

2. The computing platform of claim 1, wherein the processing hardware is configured to execute the software code to edit the annotation taxonomy by modifying the problematic term when classified as the flawed term.

3. The computing platform of claim 1, wherein the processing hardware is configured to execute the software code to edit the annotation taxonomy by adding another tag to the annotation taxonomy as an alternative to the problematic term when classified as the flawed term.

4. The computing platform of claim 1, wherein the processing hardware is configured to execute the software code to edit the annotation taxonomy by substituting another term for the problematic term when classified as the flawed term.

5. The computing platform of claim 1, wherein the processing hardware is configured to execute the software code to edit the annotation taxonomy by deleting the problematic term when classified as the flawed term.

6. A computing platform comprising:
a processing hardware;
a system memory storing a software code; and
a machine learning model based classifier;
the processing hardware configured to execute the software code to:
  receive tagging quality assurance (QA) data including a plurality of terms applied as tags;

identify, using the tagging QA data, a problematic term of the plurality of terms;

classify, using the machine learning model based classifier, the problematic term as one of a confusing term or a flawed term;

obtain, when the problematic term is classified as the confusing term, a comparative sample for clarifying use of the problematic term as a tag;

obtain, when the problematic term is classified as the flawed term, a modification data for editing an annotation taxonomy including the problematic term;

receive another tagging QA data including another plurality of terms applied as tags by a trained machine learning model based automated tagging system, and a plurality of corrections to the tags;

identify, using the another tagging QA data, an automated problematic term of the another plurality of terms;

classify, using the another tagging QA data, the automated problematic term as one of a re-trainable term or another flawed term;

obtain, when the automated problematic term is classified as the re-trainable term, one or more parameters for adjusting the trained machine learning model based automated tagging system; and obtain, when the automated problematic term is classified as the another flawed term, another modification data for editing the annotation taxonomy.

7. The computing platform of claim 6, wherein the processing hardware is further configured to execute the software code to:

adjust the trained machine learning model based automated tagging system using the one or more parameters when the automated problematic term is classified as the re-trainable term.

8. The computing platform of claim 6, wherein the processing hardware is further configured to execute the software code to:

edit the annotation taxonomy using the modification data when the problematic term is classified as the flawed term, or edit the annotation taxonomy using the another modification data when the automated problematic term is classified as the another flawed term, to produce a modified annotation taxonomy.

9. The computing platform of claim 8, wherein the processing hardware is configured to execute the software code to edit the annotation taxonomy by modifying the problematic term or the automated problematic term.

10. The computing platform of claim 8, wherein the processing hardware is configured to execute the software code to edit the annotation taxonomy by adding another tag to the annotation taxonomy as an alternative to the problematic term or the automated problematic term.

11. The computing platform of claim 8, wherein the processing hardware is configured to execute the software code to edit the annotation taxonomy by substituting another term for the problematic term or the automated problematic term.

12. The computing platform of claim 8, wherein the processing hardware is configured to execute the software code to edit the annotation taxonomy by deleting the problematic term or the automated problematic term from the annotation taxonomy.

13. A method for use by a computing platform, the method comprising:

receiving tagging quality assurance (QA) data including a plurality of terms applied as tags by a trained machine learning model based automated tagging system;

identifying, using the tagging QA data, a problematic term of the plurality of terms;

classifying, using the tagging QA data, the problematic term as one of a re-trainable term or a flawed term;

when the problematic term is classified as the re-trainable term, adjusting, using one or more parameters, the trained machine learning model based automated tagging system; and when the problematic term is classified as the flawed term, editing, using modification data, an annotation taxonomy.

14. The method of claim 13, wherein editing the annotation taxonomy comprises modifying the problematic term when classified as the flawed term.

15. The method of claim 13, wherein editing the annotation taxonomy comprises adding another tag to the annotation taxonomy as an alternative to the problematic term when classified as the flawed term.

16. The method of claim 13, wherein editing the annotation taxonomy comprises substituting another term for the problematic term when classified as the flawed term.

17. The method of claim 13, wherein editing the annotation taxonomy comprises deleting the problematic term when classified as the flawed term.

* * * * *